United States Patent

Okuda

[11] Patent Number: 6,149,991
[45] Date of Patent: Nov. 21, 2000

[54] ORNAMENTS

[75] Inventor: Nobuo Okuda, Tokyo, Japan

[73] Assignee: Hirose Co., Ltd., Narashino, Japan

[21] Appl. No.: 09/349,667

[22] Filed: Jul. 8, 1999

[30] Foreign Application Priority Data

Jul. 9, 1998 [JP] Japan .................................. 10-005069

[51] Int. Cl.$^7$ ..................................................... A47G 1/12
[52] U.S. Cl. .................................. 428/13; 428/15; 239/17; 239/20; 119/245; 119/246; 40/266
[58] Field of Search ...................... 428/13, 15; 239/17, 239/20; 119/245, 246, 253; 40/266, 412

[56] References Cited

U.S. PATENT DOCUMENTS 4,920,465  4/1990  Sargent ..................................... 362/96

Primary Examiner—Deborah Jones
Assistant Examiner—Abraham Bahta
Attorney, Agent, or Firm—Burgess, Ryan & Wayne

[57] ABSTRACT

An ornament 2 is floated in a water tank 5 holding water. A water pump 3 draws up water from the water tank 5 through a filter 7. The water is led to the uppermost part of the ornamental segment of the ornament 2 through a conduit 4 returns to the water tank 5 by following a circulating course passing through a first reservoir 6a, a first channel 6b, a second reservoir 6c, a second channel 6d, a third reservoir 6e and a third channel 6f. This ornament having a water circulating course enhances the decorative effect of water tanks and ponds.

5 Claims, 2 Drawing Sheets

ORNAMENTS

BACKGROUND OF THE INVENTION

This invention relates to ornaments for decorating aquariums and ponds.

Indoor aquariums and outdoor ponds have conventionally been decorated by placing natural rocks and stones and arranging natural woods and ceramic ornaments in desired layouts. With larger aquariums and ponds, ornamental rock mountains have been built, with water piping arranged to allow a stream of water to flow from the top and colonies of aquatic plants and mosses have been provided along the watercourse to enhance the decorative effect.

However, the conventional ornaments of the type described generally have been too heavy and large for a single person to carry and move. They have been difficult to set freely in position and rearrange in other layouts after being set once.

Because each piece is rather heavy, it has been necessary, when multiple ornaments are piled up, to provide sufficient stability to keep the piled pieces from collapsing. As such, the layouts for conventional ornaments have been rather flat and failed to produce sufficient ornamental effects.

In addition, heavy ornaments have not provided free choice of installation locations because the locations are required to carry heavy loads. Thus, it has been more difficult to install larger-scale ornaments involving water piping.

As described above, conventional ornaments for aquariums and ponds have not and did not produce highly decorative effects. Besides, the use of such ornaments made it difficult to provide water streams to supply fresh water to grow mosses and aquatic plants on their surface.

SUMMARY OF THE INVENTION

To eliminate the aforementioned shortcomings, this invention provides an ornament 1 made of floatable material comprising an ornament proper 2 having an ornamental segment 6 at least projecting above the water surface, a water pump 3, and a conduit 4 to carry water to the ornamental segment of the ornament.

DETAILED DESCRIPTION OF THE INVENTION

Water pumped by a water pump travels through a conduit to the ornamental segment of an ornament, flows down through the ornamental segment above the level of a pool of water below, and returns to the pool, thus forming a water circulating system.

EMBODIMENTS

The embodiments of this invention will be made explicit in the following detailed description which should be read by reference to the accompanying drawings.

Figure 1:
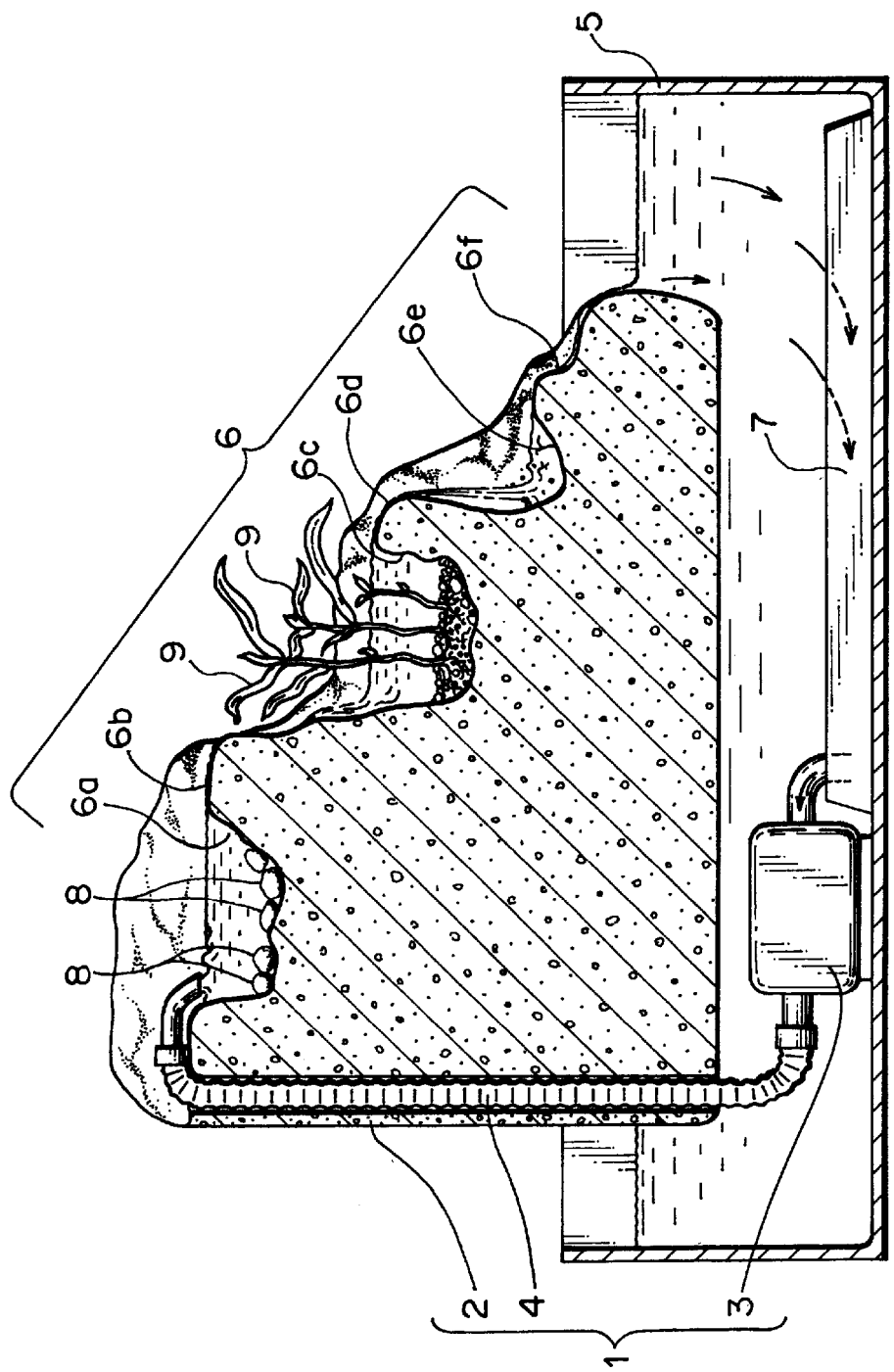
FIG. 1 is a schematic cross-sectional view of the first embodiment of this invention set in an aquarium.

An ornament 1 shown in FIG. 1 comprises an ornament proper 2 made of a floatable material, a water pump 3 and a conduit 4.

The ornament 2 is floated in a pool of water held in a tank 5 of suitable size. The ornament 2 has an ornamental segment 6 shaped in the form of false rocks at least in a portion floating above the water surface. In the illustrated embodiment, the side carrying the conduit is not included in the ornamental segment as it is assumed to be out of sight. However, all parts projecting above the water surface or the part below the water surface may be included in the ornamental segment.

The ornament 2 may be made of any material having a specific gravity lower than 1. The ornament 2 of the illustrated embodiment is made of foamed polystyrene that is easy to shape and color. Foamed polystyrene is conducive to the reduction of displacement when the ornament 2 is floated in the tank 5. This feature permits keeping a large enough quantity of water to keep pet fish in small aquariums that are placed in relatively small rooms. Besides, the ornament 2 is made of foamed polystyrene and this facilitates implantation of plants and artificial ornaments and fitting of small illuminating devices for decorative lighting.

The water pump 3 takes in water filtered through a filter 7 provided at the bottom of the tank 5. The pumped up water is then led to the top of the ornamental segment 6 of the ornament 2 through the conduit 4, flows down following the profile of the ornamental segment 6, and returns into the tank 5. Thus, the ornament 1 forms a water circulating system that includes the ornament afloat in the water pool in the tank 5.

The water circulating system need not cover the whole area of the ornamental segment 6, but may be provided in limited areas as required by the object of ornamentation. For example, the ornamental segment may be molded after a famous scenery or garden and various ornamental pieces (such as natural stones and woods, earthenwares, sculptures and foliage plants) are arranged to attract the attention of observers. The water circulating course may be disposed in peripheral areas surrounding the ornamental segment 6 so as not to destroy the design. Of course, the water circulating system need not be limited to one, but may be branched out into tributaries. Otherwise, multiple conduits 4 may be provided to lead water to several different spots. A sprinkler may be provided to sprinkle the water pumped up by the water pump 3 over the ornamental segment 6. If tourmaline that forms negative ions by reacting with water is coated over the sprayed area, a sedative effect can be added to the room. Otherwise, coating the surface of the ornament proper 2 with a substance having a sterilizing power is conducive to preventing the spoilage of water that comes into contact therewith when running over the surface.

An embodiment of the water circulating system provided in the ornamental segment 6 of the ornament proper 2 has a first reservoir 6a where water is discharged from the conduit 4 (the uppermost part of the ornamental segment 6). The water collects in the first reservoir 6a and flows down through a first channel 6b into a second reservoir 6c. The water collects in the second reservoir 6c and cascades down through a second channel 6d into a third reservoir 6e. The water collects in the third reservoir 6e and returns through a third channel 6f into the tank 5. The profile of the ornamental segment 6 defines the "hollow reservoirs" and the "channels through which the water overflowing form the reservoirs flows". Water flows through the ornamental segment 6 by following the fixed water courses thus defined. Placement of pebbles 8 and aquatic plants 9 in the reservoirs and growing colonies of mosses along and around the channels enhance the beauty of the ornament.

The ornament 1, which is used in the relatively shallow tank 5 in the embodiment just described, may be used in outdoor ponds or other larger spaces. It can be used anywhere so long as water is led from the bottom to the ornament proper 2 by extending the conduit 4 to the length permissible by the capacity of the pump 3. Because the pipe connected to the conduit 4 at the bottom serves as an anchor, the ornament proper 2 will not be carried away even when the ornament 1 is used outdoors.

Figure 2:
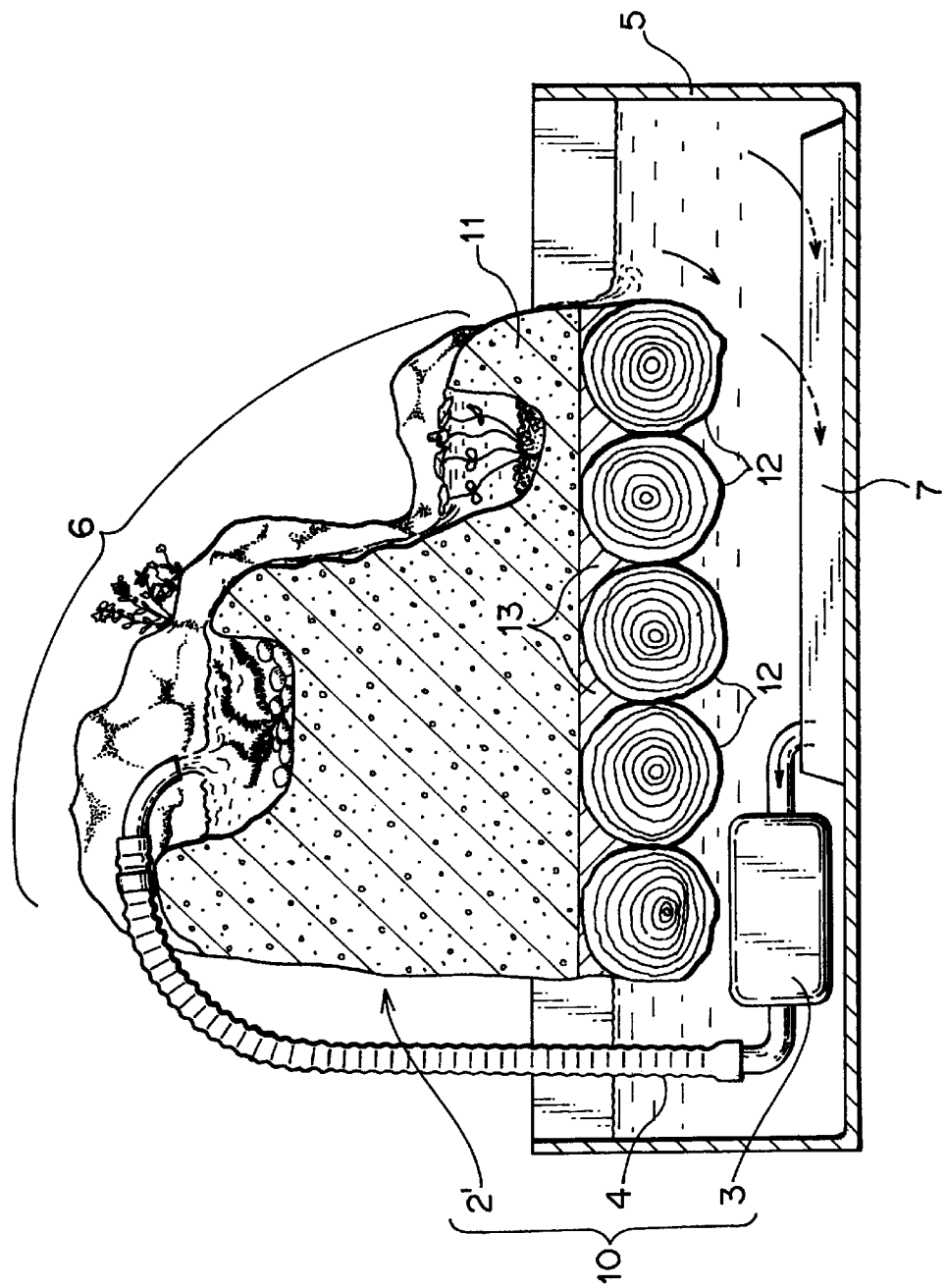
FIG. 2 is a schematic cross-sectional view of the second embodiment of this invention set in an aquarium.

While the first embodiment described above comprises the ornament proper 2 made of a single material, it may be made of combinations of several materials that will float on water and permit forming proper ornamental segments. A second embodiment of this invention is an ornament 10 (see FIG. 2) whose ornament proper 2' comprises an ornamental segment 6 consisting of a floating piece 11 of foamed polystyrene that is fastened to a raft of logs 12 of natural wood with a filler 13 of resin or other material. In FIG. 2 similar reference numerals denote parts similar to those in FIG. 1 and consequently a detailed description thereof is omitted.

The raft of logs 12 whose specific gravity is close to 1 floats on water while carrying the floating piece 11 thereabove. This design increases the stability of the ornament 2, prevents the production of violent movements by small waves, and reduces the risk of overturning when the floating piece 11 is shaped long and narrow.

As has been described, the ornament according to this invention delivers water pumped up by the water pump through the conduit to the ornamental segment of the ornament. The water then flows down through the ornamental segment that lies above the water surface into the tank below, thus forming a circulating system. This permits a cyclic supply of water to the mosses and aquatic plants arranged in the ornamental segment.

The ornament made of floatable material whose specific gravity is less than 1, even when the size is large, can be easily carried or moved from the tank by one person. This feature increases the freedom of decoration in layouts and settings. The water circulated through the ornamental segment of the ornament permits naturally growing mosses and aquatic plants without requiring installation of costly piping. The natural mosses and aquatic plants add much greater beauty to the ornamental segment of the ornament than the conventional products decorated with imitations.

Floating the ornament in the water tank permits reducing the displacement of water, which, in turn, permits securing a large enough quantity of water to grow pet fish and other living things.

What is claimed is:

1. An ornament made of a floatable material and having an ornamental segment at least in a portion of the ornament projecting above the water surface, a water pump to draw up water and a conduit to deliver the water drawn up by the water pump to the ornamental segment of said ornament, said ornamental segment comprising at least one reservoir and channel for directing a flow of water over said ornamental segment, said ornamental segment arranged on a floating raft.

2. The ornament of claim 1 wherein the at least one reservoir containing at least one member selected from the group consisting of rocks and plants.

3. The ornament of claim 1 wherein the pump is a submersible pump.

4. The ornament of claim 1 wherein said ornament comprises foamed polystyrene.

5. The ornament of claim 1 wherein the conduit is arranged out of view within the ornament.

* * * * *